(12) United States Patent
Shingleton

(10) Patent No.: US 7,554,030 B2
(45) Date of Patent: Jun. 30, 2009

(54) TRACKING SOLAR COLLECTOR ASSEMBLY

(75) Inventor: Jefferson G. Shingleton, Auburn, NY (US)

(73) Assignee: Sunpower Corporation, Systems, Richmond, CA (US)

( * ) Notice: Subject to any disclaimer, the term of this patent is extended or adjusted under 35 U.S.C. 154(b) by 781 days.

(21) Appl. No.: 10/802,116

(22) Filed: Mar. 16, 2004

(65) Prior Publication Data

US 2004/0238025 A1   Dec. 2, 2004

Related U.S. Application Data

(60) Provisional application No. 60/455,649, filed on Mar. 18, 2003, provisional application No. 60/530,384, filed on Dec. 17, 2003.

(51) Int. Cl.
*E04B 7/02* (2006.01)
*H02N 6/00* (2006.01)
*H01L 25/00* (2006.01)

(52) U.S. Cl. .................. 136/246; 136/244; 126/600; 126/605; 126/608

(58) Field of Classification Search ............. 136/244, 136/246; 126/600, 606
See application file for complete search history.

(56) References Cited

U.S. PATENT DOCUMENTS

| | | |
|---|---|---|
| 3,565,719 A | 2/1971 | Webb |
| 4,000,734 A | 1/1977 | Matlock et al. |
| 4,103,672 A | 8/1978 | Meyer |
| 4,138,994 A | 2/1979 | Shipley, Jr. |
| 4,159,710 A | 7/1979 | Prast |
| 4,173,213 A | 11/1979 | Kelly |

(Continued)

FOREIGN PATENT DOCUMENTS

AU    520 336 B    1/1982

(Continued)

OTHER PUBLICATIONS

Shugar et al., Commercialization of a Value-Engineered Photovoltaic Tracking System, Proceedings of the 25th IEEE Photovoltaic Specialists Conference, May 1996, pp. 1537-1540, Washington, DC, USA.

(Continued)

*Primary Examiner*—Alexa D Neckel
*Assistant Examiner*—Golam Mowla
(74) *Attorney, Agent, or Firm*—James F. Hann; Haynes Beffel & Wolfeld LLP

(57) ABSTRACT

A tracking solar collector assembly includes Southside supports, North side supports and support structures. Each support structure has pivotal support points defining a tilt axis and supports at least one solar collector. First support points of first and second support structures are pivotally connected to first and second Southside supports. A second support point of the first support structure is pivotally connected to first and second North side supports. A second support point of the second support structure is pivotally connected to second and third North side supports. A tilting assembly causes the solar collector support structures and the solar collectors tilt in unison. A tracking solar collector may comprise a torsion tube rotatable about a torsion tube axis; with the solar panels secured to the torsion tube at an angle with the solar panels located entirely above the torsion tube at noontime.

32 Claims, 18 Drawing Sheets

U.S. PATENT DOCUMENTS

| | | | |
|---|---|---|---|
| 4,184,482 A | 1/1980 | Cohen | |
| 4,187,123 A | 2/1980 | Diggs | |
| 4,316,448 A | 2/1982 | Dodge | |
| 4,345,582 A | 8/1982 | Aharon | |
| 4,365,617 A | 12/1982 | Bugash et al. | |
| 4,370,974 A | 2/1983 | Maxey | |
| 4,404,465 A | 9/1983 | Miller | |
| 4,429,178 A | 1/1984 | Prideaux et al. | |
| 4,585,318 A | 4/1986 | Seifert | |
| 4,644,933 A | 2/1987 | Gregory | |
| 4,765,309 A | 8/1988 | Legge et al. | |
| 4,771,764 A | 9/1988 | Cluff | |
| 4,832,001 A | 5/1989 | Baer | |
| 4,966,631 A | 10/1990 | Matlin et al. | |
| 4,995,377 A | 2/1991 | Eiden | |
| 5,131,955 A | 7/1992 | Stern et al. | |
| 5,228,924 A | 7/1993 | Barker et al. | |
| 5,253,637 A | 10/1993 | Maiden | |
| 5,505,788 A | 4/1996 | Dinwoodie | |
| 5,542,409 A | 8/1996 | Sampayo | |
| 5,632,823 A * | 5/1997 | Sharan | 136/246 |
| 5,730,117 A | 3/1998 | Berger | |
| 5,776,262 A | 7/1998 | Melchior | |
| 6,058,930 A | 5/2000 | Shingleton | |
| 6,722,357 B2 | 4/2004 | Shingleton | |
| 2003/0005954 A1 | 1/2003 | Emoto et al. | |
| 2003/0070705 A1 | 4/2003 | Hayden et al. | |

FOREIGN PATENT DOCUMENTS

| | | |
|---|---|---|
| AU | 581977 B2 | 10/1986 |
| DE | 386 264 C | 12/1923 |
| DE | 9013951 U1 | 5/1991 |
| FR | 2461331 | 1/1981 |
| FR | 2 608 741 A | 6/1988 |
| GB | 733010 | 6/1955 |
| GB | 2357785 A | 4/2001 |
| JP | 56 118021 A | 9/1981 |
| JP | 61 39585 A | 5/1984 |
| JP | 59 231362 A | 12/1984 |
| JP | 60 169173 | 9/1985 |
| JP | 11340491 A | 10/1999 |
| WO | WO 00/31477 A1 | 6/2000 |
| WO | WO 01/55651 A1 | 8/2001 |

OTHER PUBLICATIONS

Shugar et al., Design and Prototype of a Minimal Cost Tracking Photovoltaic Array Structure, Proceedings of the American Solar Energy Society Conference, Solar '95, Jul. 1995, Minneapolis, MN, USA.

* cited by examiner

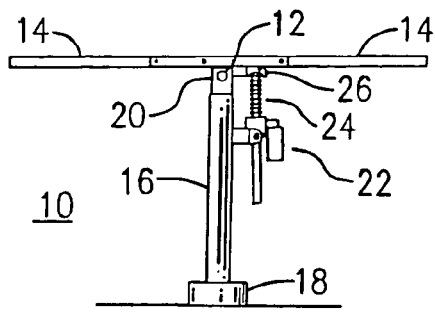
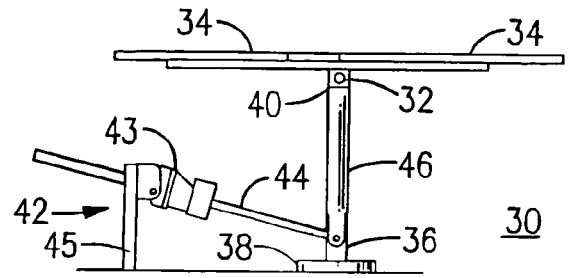
FIG. 1A
PRIOR ART
FIG. 2A
PRIOR ART
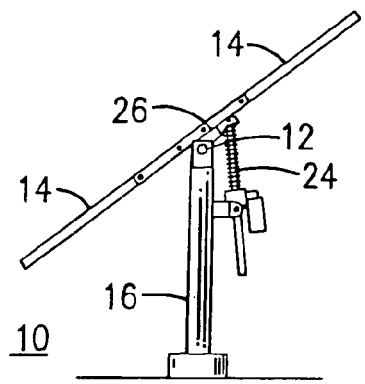
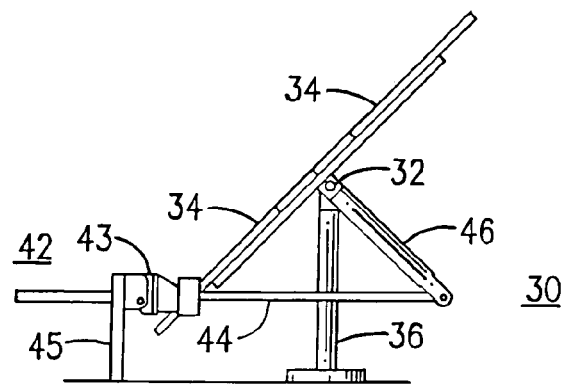
FIG. 1B
PRIOR ART
FIG. 2B
PRIOR ART
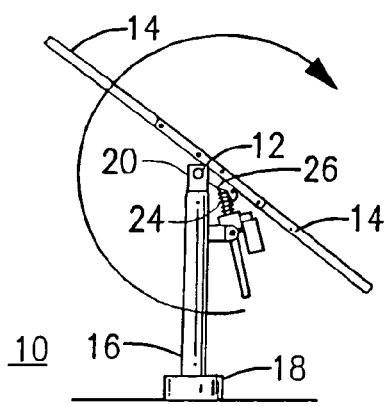
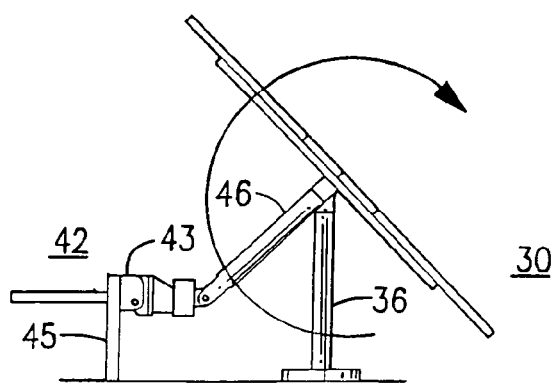
FIG. 1C
PRIOR ART
FIG. 2C
PRIOR ART

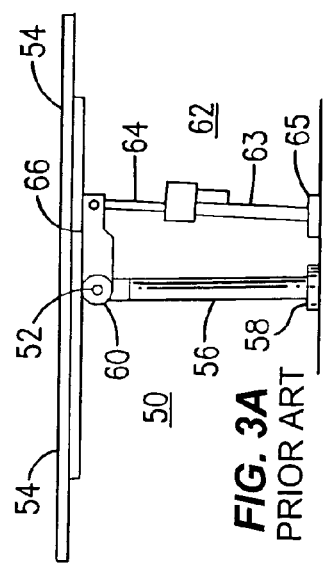
FIG. 3A PRIOR ART
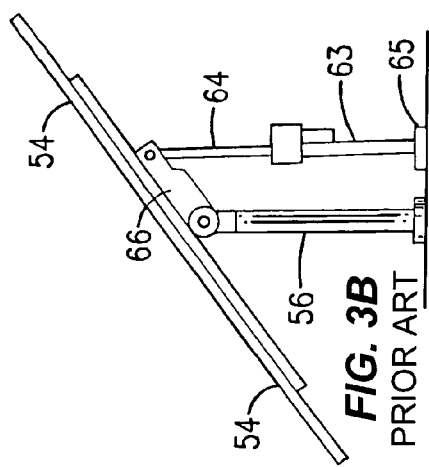
FIG. 3B PRIOR ART
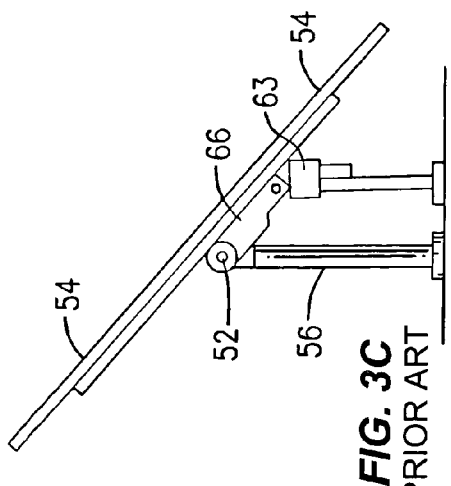
FIG. 3C PRIOR ART
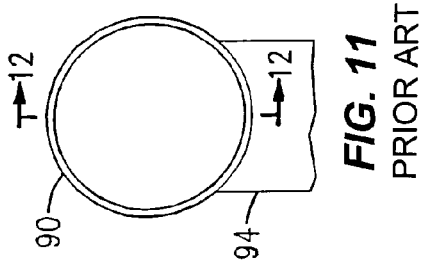
FIG. 11 PRIOR ART
FIG. 12 PRIOR ART
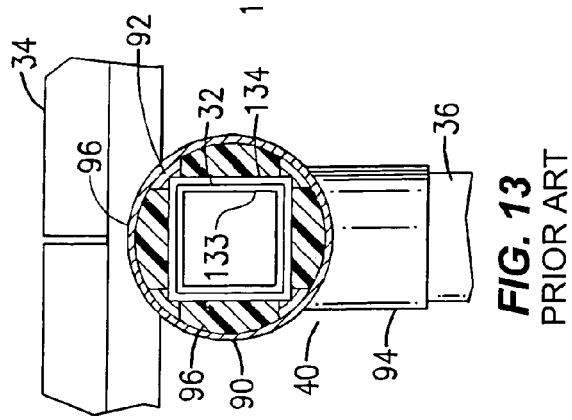
FIG. 13 PRIOR ART
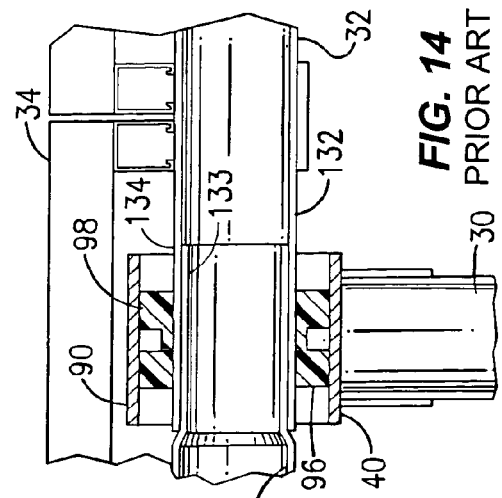
FIG. 14 PRIOR ART

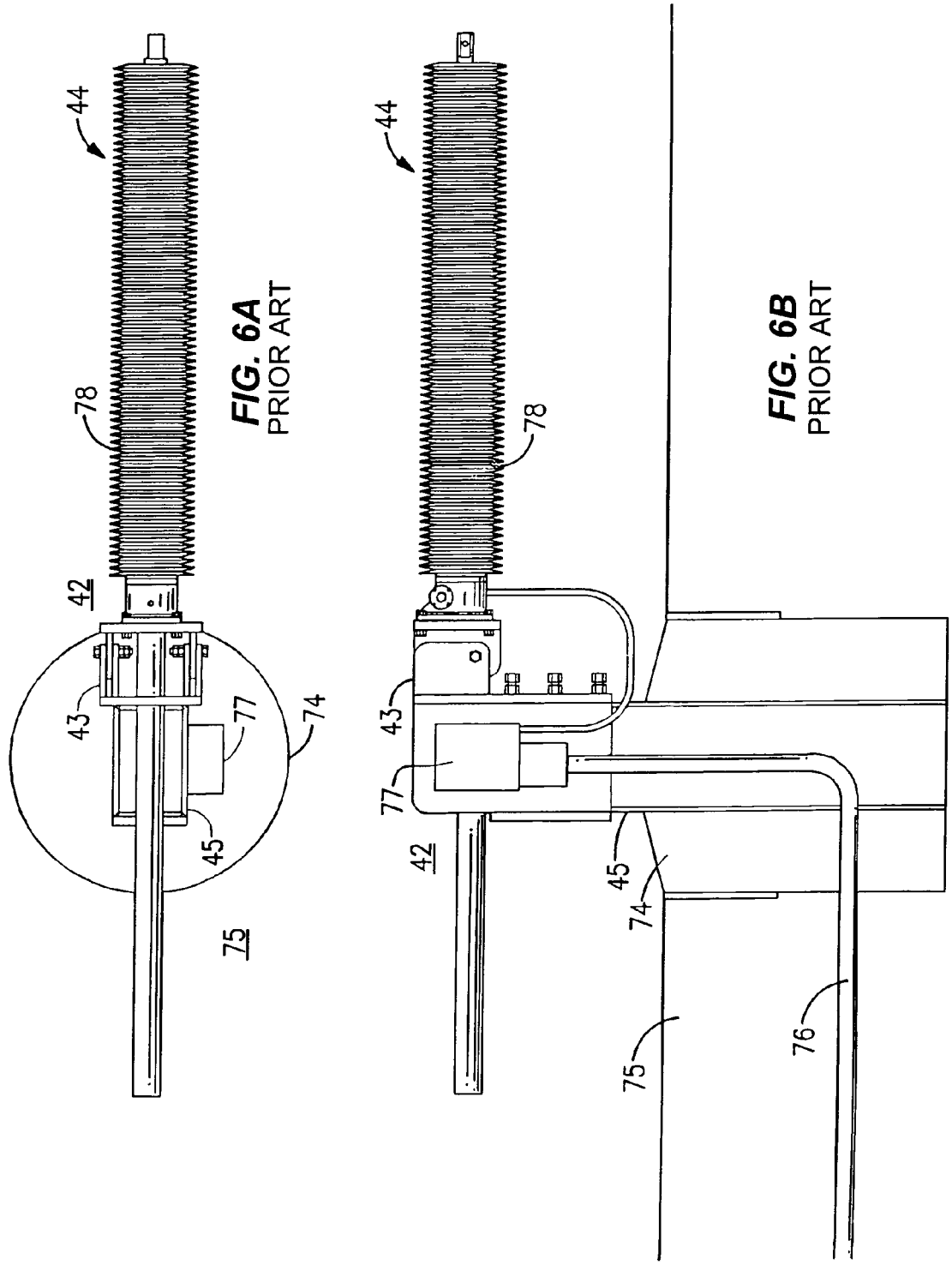

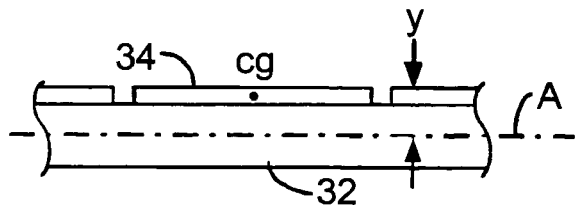
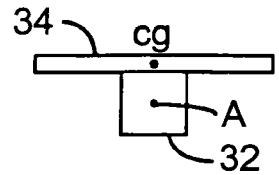
FIG. 15 PRIOR ART     FIG. 16 PRIOR ART
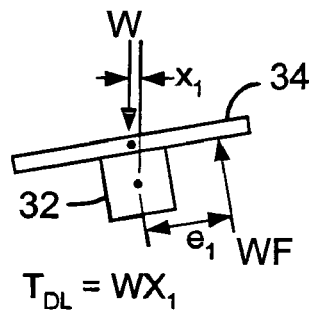
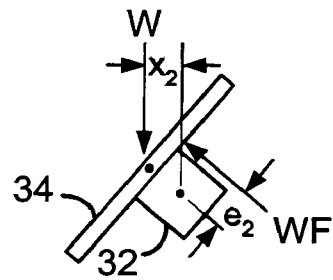
$T_{DL} = WX_1$
$T_{W1} = WFe_1$
FIG. 17 PRIOR ART     FIG. 18 PRIOR ART
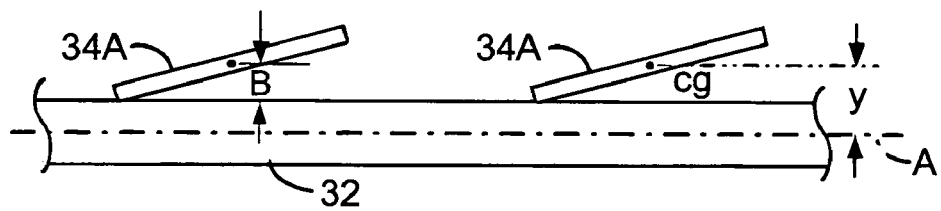
FIG. 19
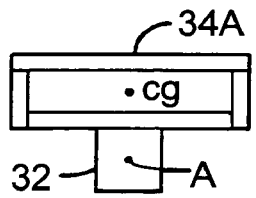
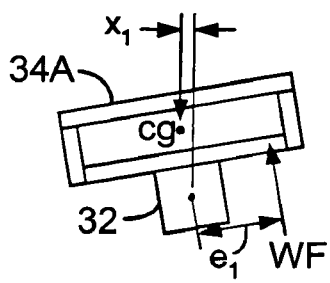
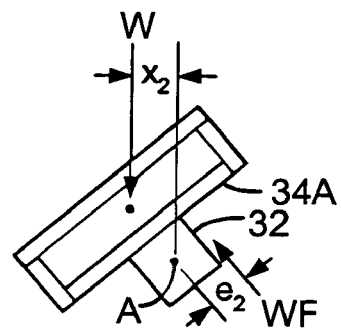
FIG. 20     FIG. 21     FIG. 22

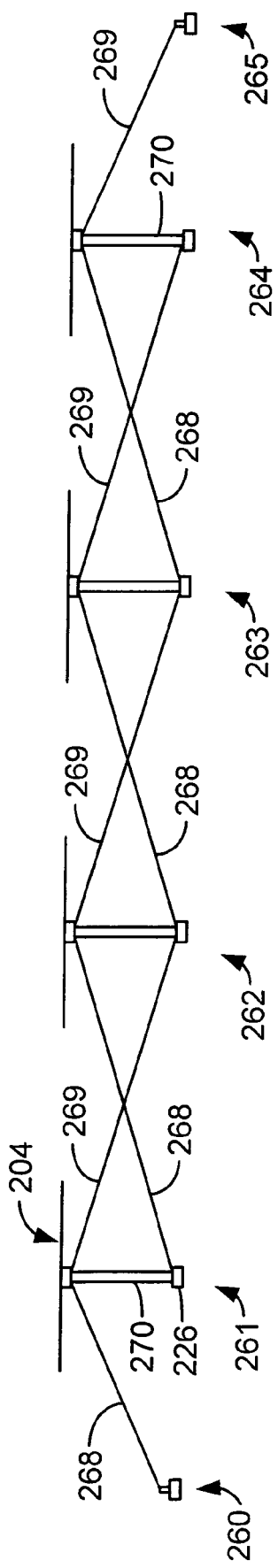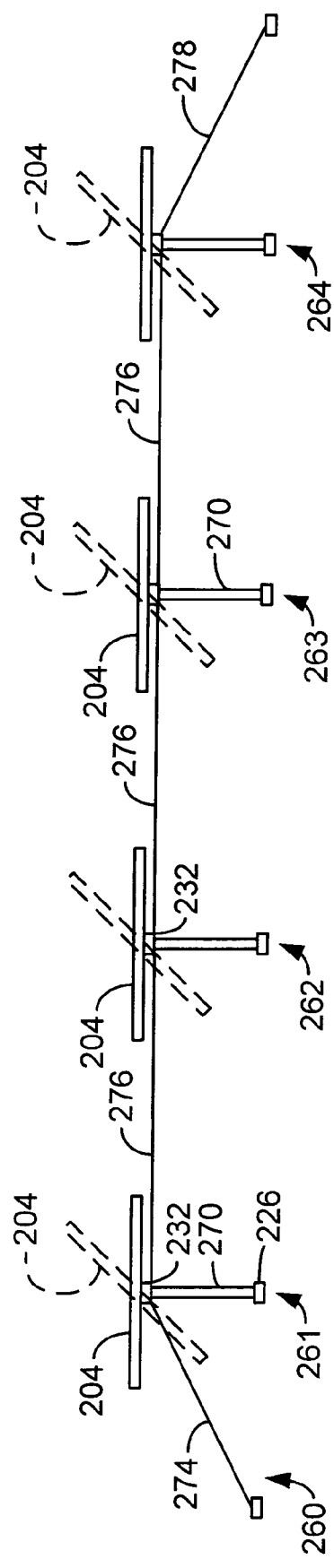

TRACKING SOLAR COLLECTOR ASSEMBLY

CROSS-REFERENCE TO OTHER APPLICATIONS

This application claims the benefit of U.S. Provisional Application No. 60/455,649, filed Mar. 18, 2003 and U.S. Provisional Patent Application No. 60/530,384, filed 17 Dec. 2003. This application is related to U.S. Pat. No. 6,058,930, issued 9 May 2000.

FEDERALLY SPONSORED RESEARCH OR DEVELOPMENT

None.

BACKGROUND OF THE INVENTION

This invention relates to solar energy collection, and in particular to an arrangement for driving a number of rows of solar panels to track the motion of the sun relative to the earth. The invention is more particularly directed to improvements in efficiency and reliability in the tracker arrangement for rocking, or rotating, a group or array of rows of solar panels. The invention applies to solar collectors in which the panels are arrays of photovoltaic cells for generating electrical power, but the same principles can be applied also to arrangements for solar heating, for example.

Photovoltaic arrays are used for a variety of purposes, including as a utility interactive power system, as a power supply for a remote or unmanned site, a cellular phone switch-site power supply, or a village power supply. These arrays can have a capacity from a few kilowatts to a hundred kilowatts or more, and can be installed wherever there is a reasonably flat area with exposure to the sun for significant portions of the day.

In general terms, these systems have their photovoltaic panels in the form of rows supported on a torque tube that serves as an axis. A tracker drive system rotates or rocks the rows to keep the panels as square to the sun as possible. Usually, the rows are arranged with their axes disposed in a north-south direction, and the trackers gradually rotate the rows of panels throughout the day from an east-facing direction in the morning to a west-facing direction in the afternoon. The rows of panels are brought back to the east-facing orientation for the next day.

One solar collector arrangement of this type is shown in Barker et al. U.S. Pat. No. 5,228,924. There, each row of panels is affixed to a horizontal pivot shaft that is supported on two or more support piers on which the pivot shaft is journalled. A drive mechanism is mounted on one of the piers, and pushes against the solar panel at some point that is displaced from the shaft. In that case, the drive is of the screw type, and as a drive motor rotates, a shaft retracts or extends to rotate the row of panels in one direction or the other. In this arrangement, each row of panels has its own respective drive mechanism, and so these all have to be synchronized to follow the sun together. With a pier-mounted drive, it is difficult or impossible to use a single driver to move more than one row of solar panels.

SUMMARY OF THE INVENTION

One aspect of the invention is directed to tracking solar collector assembly including first and second Southside supports and first, second and third north side supports. The Southside supports and the North side supports define first and second generally parallel paths. The assembly also includes first and second solar collector support structures. Each solar collector support structure has first and second spaced apart pivotal support points, the support points defining a tilt axis. At least one solar collector is mounted to each solar collector support structure. The first support points of the first and second solar collector support structures are pivotally connected to and supported by the first and second Southside supports, respectively. The second support point of the first solar collector support structure is pivotally connected to and supported by the first and second North side supports. The second support point of the second solar collector support structure is pivotally connected to and supported by the second and third North side supports. The assembly further includes a tilting assembly. The tilting assembly includes a drive element secured to each solar collector support structure; a drive element coupler operably coupling the drive elements, the drive elements and the drive element coupler creating a drive assembly; and a driver coupled to the drive assembly so that operation of the driver causes the drive elements move in unison thus causing the solar collector support structures and the solar collectors therewith to tilt in unison.

Another aspect of the invention is directed to tracking solar collector of the type comprising a series of supports oriented on a generally north-south axis; a torsion tube, having a torsion tube axis, rotatably mounted to the supports to permit rotation of the torsion tube about the torsion tube axis; a torsion tube rotator operably coupled to the torsion tube so to rotate the torsion tube between morning, noontime and evening angular orientations; and solar panels, each having a center of gravity. The improvement comprises mounting structure securing the solar panels to the torsion tube at a chosen angle to the torsion tube axis with each of the solar panels located entirely vertically above the torsion tube axis when the torsion tube is at the noontime angular orientation.

BRIEF DESCRIPTION OF THE DRAWINGS

FIGS. 1-18 illustrate conventional solar collector and tracker arrangements.

FIGS. 1A, 1B, and 1C are end elevations showing a row of solar panels having a conventional pier mounted driver.

FIGS. 2A, 2B, and 2C are end elevations showing a row of solar panels having a conventional horizontal ground-supported driver.

FIGS. 3A, 3B, and 3C are end elevations showing a row of solar panels having a conventional vertical ground-supported driver.

FIG. 5 is a detail view showing the linkage articulation feature.

FIG. 6A is a top view of a horizontal driver and FIG. 6B is a side elevational view thereof.

FIG. 7 illustrates a plurality of rows of the vertical driver solar panels configured for uneven terrain.

FIG. 8 illustrates a plurality of rows of the horizontal driver solar panels configured for uneven terrain.

FIGS. 9A, 9B, and 9C are plan views of arrays of rows of solar panels.

FIG. 10 is an elevation taken at 10-10 in FIG. 9A.

FIGS. 11 and 12 are an end view of a bearing sleeve and a cross section taken at 12-12 of FIG. 11, respectively.

FIGS. 13 and 14 are a cross section and an axial section of the torque tube and pier bearing, showing a coupling between torque tube sections.

FIG. 15 is a simplified side elevational view of a section of the torque tube and the solar panels of FIG. 2A, shown at a noontime or midday orientation and viewed along an east-west orientation, illustrating the distance between the center of gravity of the solar panel and the torsion tube axis.

FIG. 16 is a simplified view of the apparatus of FIG. 15 viewed along the torsion tube axis.

FIGS. 17 and 18 are similar to FIG. 16 with the structure at a relatively low tilt angle in FIG. 17 and a correspondingly small torque arm $X_1$, and a relatively large tilt angle in FIG. 18 with a longer torque arm $X_2$.

FIGS. 19-24 and 25-33 illustrate first and second embodiments of the present invention.

FIG. 19 is a simplified representation of a first embodiment of present invention, similar to the view of FIG. 15, illustrating mounting a solar panels to the torsion tube and so that the solar panels are oriented at an angle to the torsion tube axis.

FIGS. 20-22 are views of the invention of FIG. 19 corresponding to FIG. 16-18 and illustrating that, due to the tilt angle shown in FIG. 19, torque arms $X_1$ and $X_2$ are longer than in the structure shown in FIGS. 16-18.

FIG. 23 illustrates a portion of a solar collector and tracking system made according to the invention of FIGS. 19-22 with the torque tubes oriented at an angle similar to that shown in FIG. 21.

FIG. 24 is a cross-sectional view of one of the mounting plates taken along line 24-24 of FIG. 23.

FIG. 25 is a downwardly and North-facing view of the ends of two rows of tracking solar collection assemblies of a second embodiment of the invention with the PV module arrays of each tracking solar collector at a no-tilt, noontime orientation.

FIG. 26 shows the assembly of FIG. 25 with the PV module arrays tilted to the West at a West-tilting, afternoon tilt orientation.

FIG. 27 is a side view of a tracking solar collector of FIG. 25.

FIG. 28 is an upwardly and South-East-facing view of a tracking solar collector of FIG. 25.

FIG. 29 is enlarged view illustrating the tilting assembly, the tilting assembly including a driver connected to a drive element coupler and a drive element connecting the torque tube to the drive element coupler. FIG. 29 also shows connection of the torque tube to the upper end of the post of a South side support.

FIG. 30 is enlarged view of the base of a North side support of FIG. 28.

FIG. 31 is an enlarged view illustrating the connection of the struts from two North side supports to the second support along the torque tube of FIG. 28.

FIG. 32 is a simplified South-facing view of an alternative to the North side supports of FIGS. 25-31.

FIG. 33 is a simplified South-facing view of an alternative to the North side supports of FIG. 32.

DESCRIPTION OF THE SPECIFIC EMBODIMENTS

Figure 5:
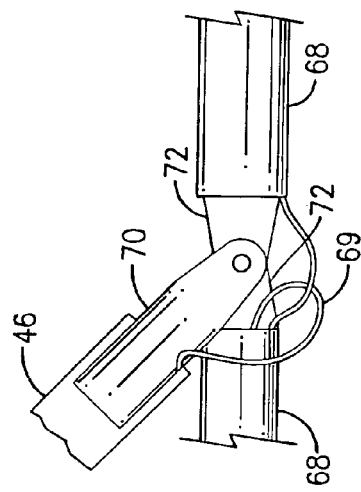

With reference to the Drawing, and initially to FIGS. 1A to 1C, a solar tracker array 10 according to the prior art, here is shown from a north aspect. A torque tube 12 serves as a north-south axis, and a row of solar panels 14 is attached onto the tube 12. These are balanced with panels similarly situated on both the east and west sides of the axis. However, as used here the term "balanced" is not strictly limited to having the panels arranged in identical fashion on each side of the tube 12. Some imbalance can be permitted, depending on mechanical factors. A vertical pier 16 has a footing 18, e.g., formed of poured concrete, serving as a foundation that is supported in the earth. There is a pivot eye 20 at the top of the pier to support the torque tube 12 so that the row of solar panels 14 can be rocked from an east-facing orientation (FIG. 1B) throughout the day to a mid-day, generally flat orientation (FIG. 1A) and to a west-facing orientation (FIG. 1C). In order to effect rocking motion of the array 10, a tracker actuator 22 is mounted onto the pier 16, and has an extendible rod member 24 that is pinned to the distal end of a torque arm or lever arm 26. In this configuration, the torque arm is about fifteen inches from the axis of the torque tube 12 to the rod member 24, and the linear actuator 22 has a stroke capacity of about twenty-four inches. The width of the row of solar panels 14 is about 12 feet. Here, the torque arm 26 is shown as a separate member attached to the torque tube, and disposed parallel to the plane of the solar panels 14. However, in some equivalent arrangements, a pipe or bar could be used, situated parallel to the torque tube and carried on one side of the row of panels 14. As discussed previously, with the pier-connected drive of this arrangement, the tracker arrangement is limited only to a vertical drive arrangement, and a separate driver is required for each row of solar panels. The pier 16 has to be of very heavy construction because it has to bear the weight of the tracker drive as well as the weight of the panels, and because it must endure bending torques imposed by the pier-mounted drive. The stroke of the tracker drive is necessarily limited, and so the possible length of the torque arm 26 is likewise limited. This means that the drive force that the actuator 22 has to impose must be rather high An embodiment of this invention is shown in FIGS. 2A to 2C, which show a solar tracker array 30, viewed along its north-south axis, and rocked into its mid-day orientation (FIG. 2A), an east-looking orientation (FIG. 2B) and a west-looking orientation (FIG. 2C). A row of solar panels 34 is supported in a balanced manner by a torque tube 32 which is journalled in a bearing 40 on top of a pier 36. As in FIGS. 1A to 1C, the pier has a footing 38 set into the earth (or equivalent foundation). In this case, a torque arm 46 is disposed vertically (in FIG. 2A), that is, generally perpendicular to the plane of the solar panels 34, mounted at one end to the torque tube 32. A horizontal tracker driver is formed of a linear actuator 42 having a body portion 43 that is attached to a fixed mount 45 set into the earth at some distance from the footing 38 for the pier. The actuator 42 has a generally horizontal rod member 44 that is pinned to the distal end of the torque arm 46. Because the actuator 42 is spaced from the pier 36, the stroke length of the rod member 44 can be quite long. Also, the length of the torque arm 46 can be long, and can be the length of the pier, meeting the end of the rod member 44 at ground level. If the earth is dug trenched out at this area, the length of the torque arm can exceed the height of the pier. The long torque arm reduces the amount of linear force required to rock the solar panels. Also, because of the extended torque arm 46, the actuator 42 is able to absorb greater torque loads, e.g., due to winds.

Another embodiment of this invention, has a vertical ground-connected drive arrangement, and is shown in FIG. 3A to 3C. Here a row 50 of solar panels 54 is mounted on a torsion tube 52 that is supported in bearing members 60 atop one or more piers 56, each pier having a footing 58 supported in the earth. A linear actuator 62 has a vertically oriented body member 63 and a rod member 64 that extends generally upwards to a torque arm 66 that is fixed to the torsion tube 52. The body portion is supported on a mount or footing 65 that is separated from the footings for the piers. In some embodiments, however, the actuator can share the same footing as one or more of the piers, as long as the long throw lever arm or torque arm is achieved. In this case, the length of the torque arm 66 is considerably larger than the torque arm 26 of the prior art.

Figure 4A:
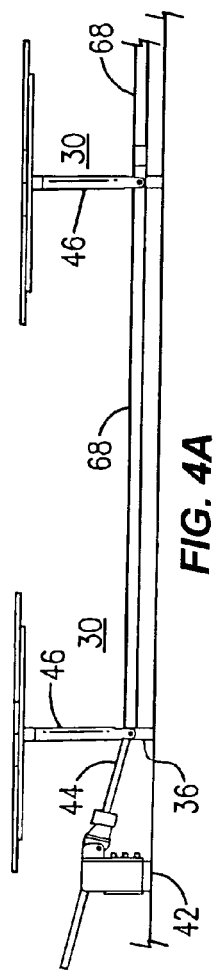
FIGS. 4A, 4B, and 4C are end elevations of a plurality of rows of solar panels employing a ground-supported horizontal drive arrangement.
Figure 4B:
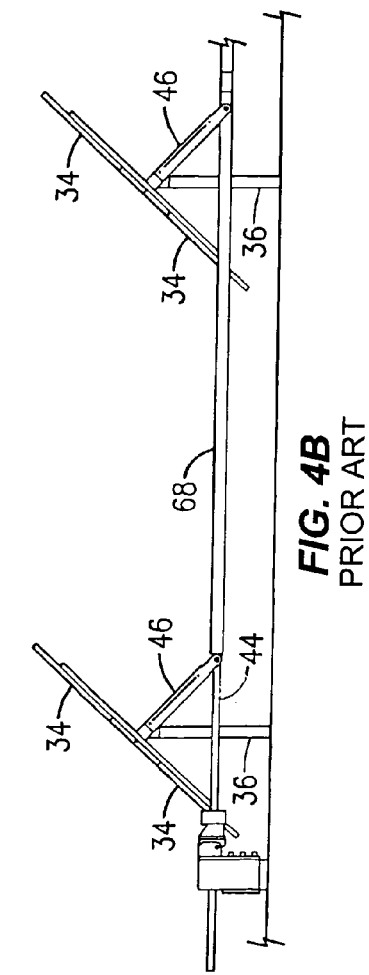
Figure 4C:
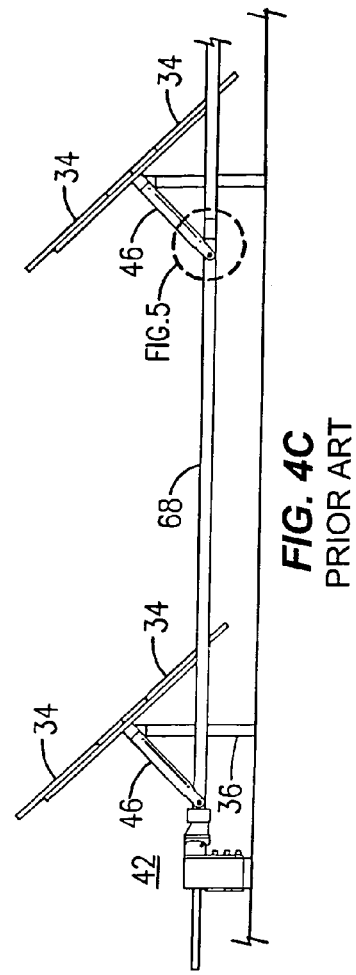

An array of rows of solar panels can all be driven by a single horizontal linear actuator, and an example of this configuration is illustrated in FIGS. 4A, 4B, and 4C. Here, there are a series of row arrangements 30 as in FIGS. 2A-2C, all arranged in parallel, with their respective torsion tubes 32 disposed in a north-south orientation. A single horizontal tracker driver 42 has its rod member 44 connected to the torque arm 46 of a first one of the row arrangements 30. A horizontal tubular link member 68 then joins that torque arm 46 to the next torque arm 46. In like manner, successive link members 68 are disposed across the entire group of row arrangements. These link members 68 are articulated to the torque arms 46 and to one another as illustrated in FIG. 5. Wires 69 may be run inside the tubular members. Here, a distal end 70 of the torque arm 46 is connected with a pivot pin to eye members 72 at the ends of the link members 68. Of course, in other embodiments, a single rigid elongated member could be employed in place of a series of articulated link members. In this embodiment, the single driver 42 moves all the row arrangements 30 of the array from an east-facing orientation (FIG. 4B) through a mid-day orientation (FIG. 4A) to a west-facing orientation (FIG. 4C). Also, in this arrangement, the driver is shown positioned at the first or easternmost one of the row arrangements 30, but the driver 42 could be positioned with an interior row or with the row at the other end.

Details of the horizontal driver or linear actuator 42 are shown in FIGS. 6A and 6B. Here the mount 45 for the actuator is secured in a poured concrete footing 74 in the earth 75. The footing can be of 3000 psi concrete, about two feet in diameter and about five to six feet in depth, with the soil about it being recompacted. Also shown here are an electrical conduit 76 bringing power and signal to an electrical distribution box 77 mounted on the side of the actuator 72. Also shown here is a protective boot or sleeve 78 that fits over the rod member 44.

Figure 7:
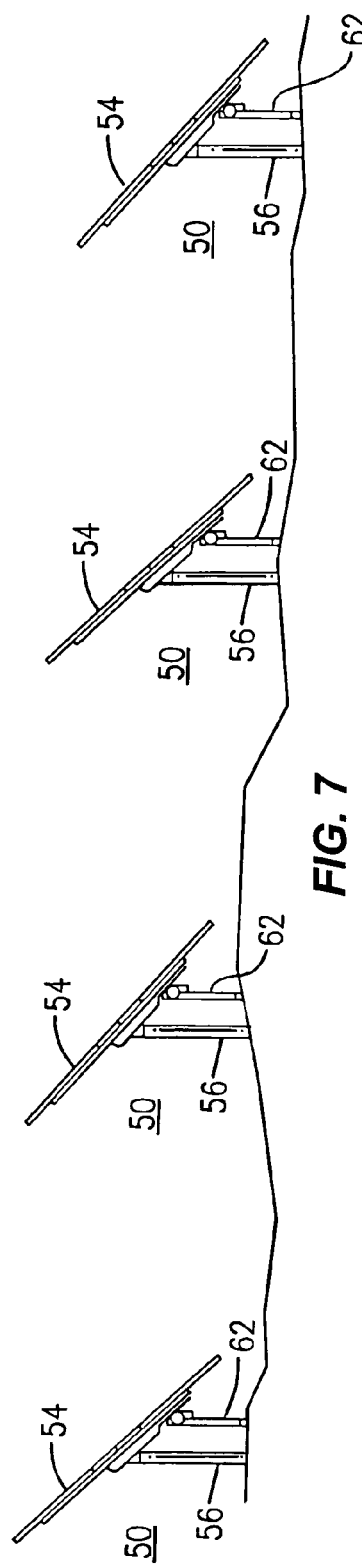
Figure 8:
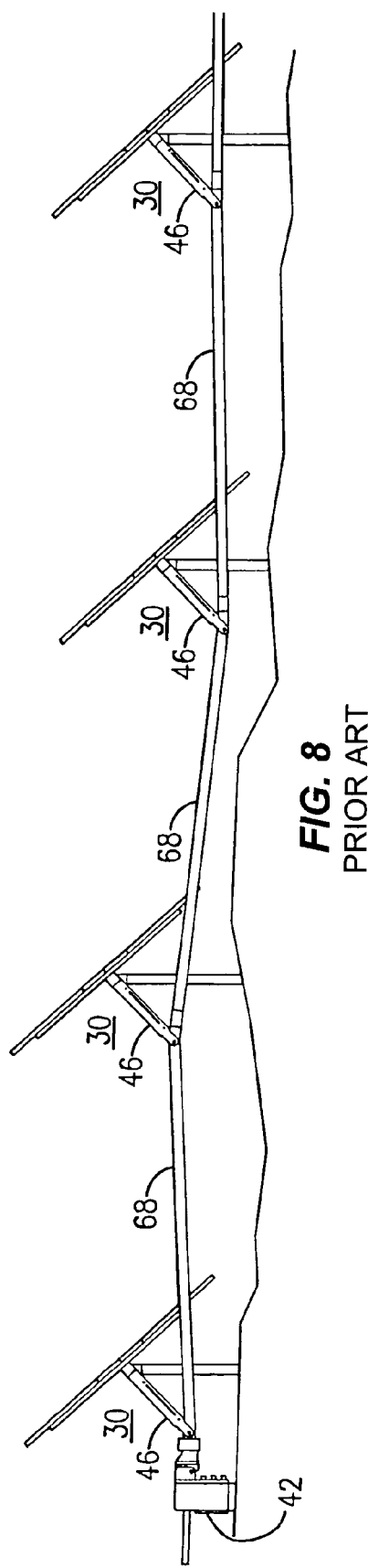

The solar panel arrangements of this invention can be installed on uneven terrain as generally illustrated in FIGS. 7 and 8.

In the FIG. 7 arrangement, a plurality of row arrangements 50 of the type with vertical drivers (as shown in FIGS. 3A-3C) are each installed in parallel. In this arrangement, each of the rows can be selectively programmed for respective degrees of tilt in the early morning and late afternoon so as to create a minimum of shadow on the next adjacent row of solar panels, as they may be at different altitudes. Here, the piers 56, panels 54, and actuators 62 are as generally described earlier.

In the FIG. 8 arrangement, a series of row arrangements 30 of the type having a horizontal driver are employed, e.g., as shown in FIGS. 2A-2C and 4A-4C. The piers 36, panels 44, torque arms 56, and the actuator 42 are as generally described before. The articulated linkage mechanism, formed of the series of articulated rigid link members 68, accommodates differences in elevation, as shown, yet achieves accurate tracking.

Figure 9:
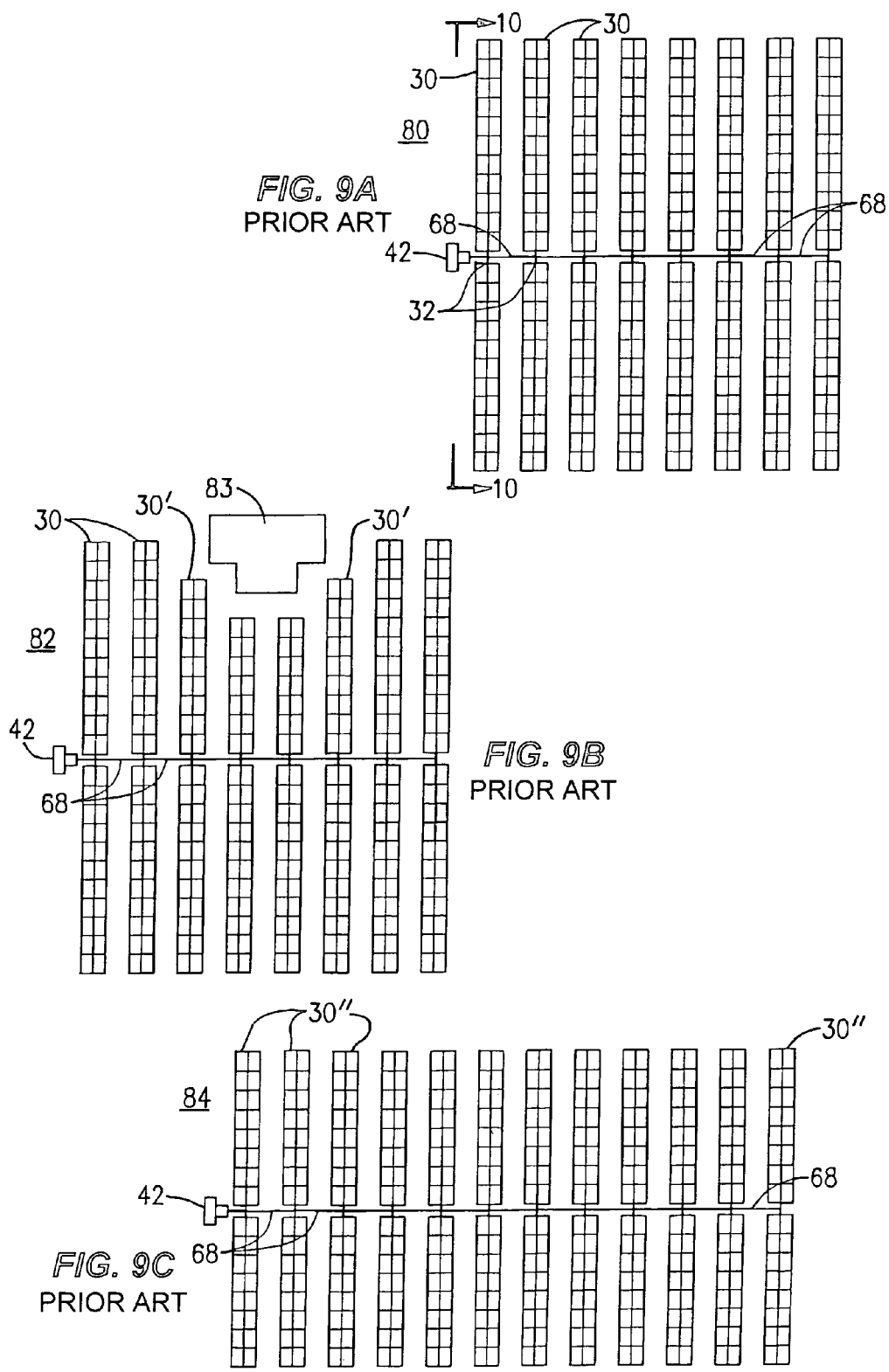
Figure 10:
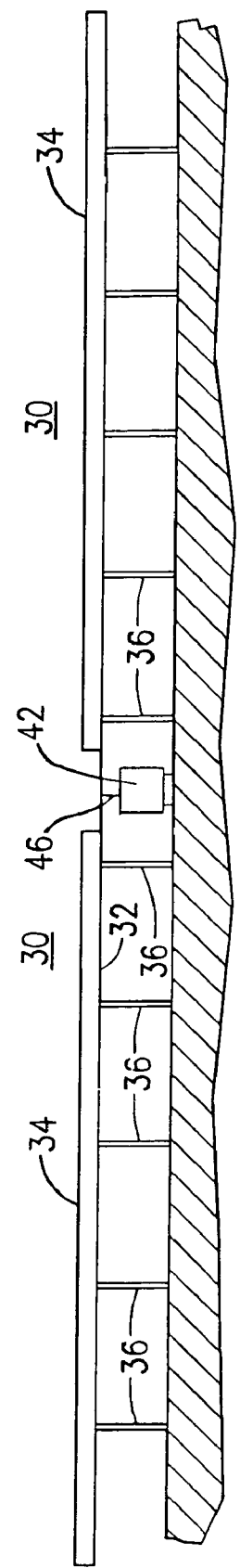

Several configurations of a large solar array according to this invention are shown in plan in FIGS. 9A, 9B, and 9C, with the understanding that these are only some of many possible configurations. A generally standard configuration of a solar array 80 is shown in FIG. 9A, where there are eight rows 30 of solar panels arranged in parallel. Each row has two wings of equal size, one north of the actuator 42 and linkage mechanism 68, and the other to the south of them. This is shown in elevation in FIG. 10, where each row 30 has its torsion tube 32 supported on a number of spaced piers 36, and with the driver actuator 42 situated at a central position between two of the piers. The torque arms 46 are affixed onto the torsion tubes 32 at this position.

As shown in FIG. 9B, a solar array 82 can include one or several rows 30' that are somewhat shortened in respect to the others in order to accommodate an obstruction 83, which may be a building, a rock outcropping, or other feature. Alternatively, depending on the site dimensions, a solar array 84 as shown in FIG. 9C can have a larger number of rows 30", which in this embodiment each have a smaller number of solar panels. Other configurations are also possible. For example, the rows can each have more solar panels to one side or the other of the position of the driver and linkage mechanism.

The coupling arrangement of torque tube sections according to this invention and the bearing design for supporting the torque tube on the piers are also novel.

Conventional tracker arrangements of the type described here generally utilize square steel tubes as beams spanning between piers, and this is regarded as optimum for carrying wind-generated torsion to the drive mechanism. The torque tube sections for adjacent spans are typically joined together at the piers, usually by insertion of their ends into a larger square tubular sleeve. This is often a part of the bearing and has to endure the rotational friction where the torque tubes are journalled. A disadvantage of the use of these steel sleeves in bearings is that they have to accommodate both rotary motion and also sliding motion resulting from thermal expansion of the equipment. The steel sleeve is in moving contact with the pier weldment. Over time, the steel-on-steel sliding contact will destroy corrosion-protective finishes, and will eventually erode the structural steel load-bearing material.

As shown in FIGS. 11 and 12, the bearing arrangement according to this invention has a bearing eye 40 which may be welded to the top of the pier 36. Here there is a generally cylindrical outer portion 90. A tubular stub 94 is welded to the cylindrical portion 90 and is mated to the pier 36. The square torque tube 32 is supported for rotation inside the cylindrical portion, by means of four plastic bearing inserts 96. Each bearing insert is disposed against a respective flat side of the torque tube 32, and each insert has a flat side facing the torsion tube 32 and a generally rounded side facing the inner wall of the outer bearing portion 90. These inserts 96 can be provided with a notch 98 so that the inserts may be bound to the torsion tube with tension bands 92. Alternatively, the inserts may be attached with screws or other means. Preferably, the plastic inserts 96 are formed of a durable resin such as polyethylene or polypropylene, with a suitable lubricant filler. A UV protective additive, such as carbon black, can also be used. These inserts can be cut from a flat sheet of material and need not be formed by expensive molding techniques. It should be appreciated that the inserts 96 easily accommodate both rotary motion of the torsion tube and also linear motion (e.g.; due to thermal expansion).

As also shown in FIG. 13, the torsion tube 32 is formed of successive tube sections 132, 132. Each section 132 has one swaged end 133 and one unswaged end 134. The swaged tube end 133 fits tightly into the unswaged end 134 of the next adjacent tube section. This eliminates the additional fabricated square tubular sleeve, and produces a tighter connection between adjacent torque tube portions. The swaging of the tube ends 133 can be carried out at low cost on line production equipment.

The term "earth" as used in reference to the foundation for the pier footings is not limited to soils and natural terrain surfaces. The solar collectors of this invention can be installed on an artificial surface, such as a building rooftop, or on the upper level of a parking ramp.

FIG. 15 is a simplified side elevational view of a section of torque tube 32 and solar panels 34 of FIG. 2A, shown at a noontime or midday orientation and viewed along an east-west orientation. This figure illustrates the distance y between the center of gravity cg of the solar panel and the torsion tube axis A. FIG. 16 is a simplified view of the apparatus of FIG. 15 viewed along torsion tube axis A. FIGS. 17 and 18 are similar to FIG. 16 with the structure at a relatively low tilt angle in FIG. 17 and a correspondingly small torque arm $X_1$, and a relatively large tilt angle in FIG. 18 with a longer torque arm $X_2$.

PV modules 34 are attached to the top of torque tube 34 in a way that minimizes the distance y from the torque tube rotational axis A to the cg of the system, that is the PV modules 34 and any mounting hardware. This was done to minimize the torque that is generated by the dead weight of the system as the system is rotated around torque tube axis A. In FIGS. 17 and 18, it can be seen that that torque is calculated as W*x, while the torque generated by the wind load is WF*e.

The above-described structure illustrated in FIGS. 1-18 is conventional.

FIGS. 19-24 illustrate a first embodiment of the present invention. The present invention differs from that exemplified in FIGS. 1-18 in that PV modules 34A are mounted on torsion tube 32 at an angle B. By tilting PV modules 34A and thereby increasing the distance y to the cg, the design torque for the torque tube greatly increases, particularly at high torque tube rotation angles, which typically or occur in the mornings and evenings.

It has previously been assumed that because the major design determinant for the torque tube size and cost is the torque on the torque tube, that it was essential to minimize both the torque generated by dead weight and the torque generated by wind force. However, through detailed investigations and analyses it has been determined that 1) the wind torque is actually highest when the torque tube rotational angle B is relatively low (for example 10-20 degrees) and lowest when the rotational angle is highest (typically 45 degrees); and 2) the dead load torque is lowest at relatively low rotational angles and highest at high rotational angles. Therefore, increase in y distance to the cg of the tilted PV modules 34A of FIGS. 19-24 does not lead to a significant increase in the design maximum torque delivered to the torque tube. Based upon this quite unexpected result, it has been determined that the size and cost of the torque tube does not increase significantly for the tilted (FIGS. 19-22) vs. horizontal (FIGS. 1-18) configurations.

Figure 23:
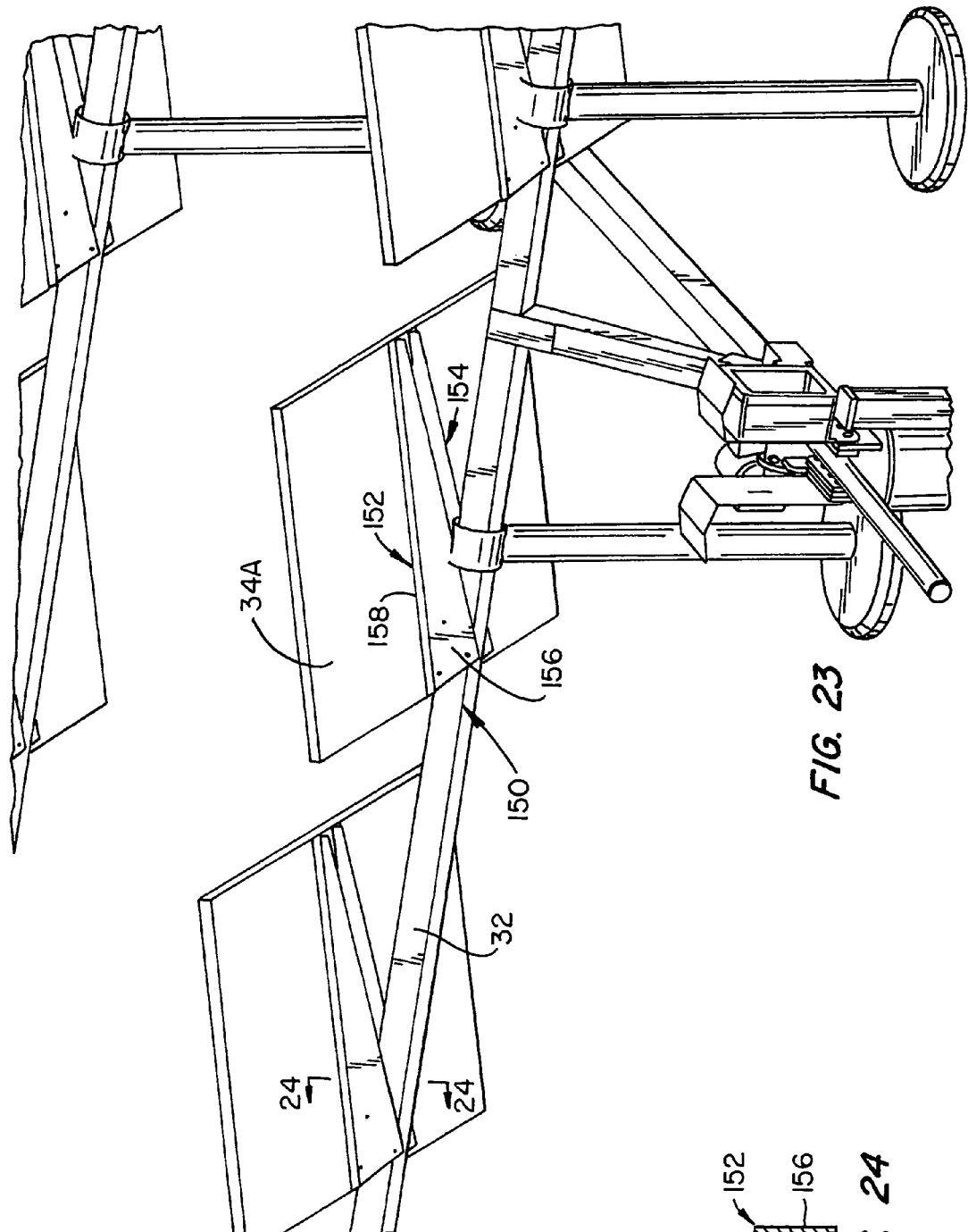
Figure 24:
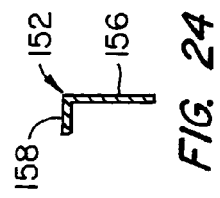

FIGS. 23 and 24 show one method for attaching PV modules 34A at a tilt angle B to torque tube 32. A mounting structure 150 comprises a pair of mounting plates 152, 154. Each mounting plate includes a generally triangular torsion tube portion 156 and an elongated, generally rectangular solar panel portion 158 extending at a right angle from torsion tube portion 156. Mounting plates 152, 154 are typically sheet-metal components bent and punched, with bolts engaging holes and clamping the mounting plates to opposite sides of torque tube 32. Attachment could also be by, for example, welding or the use of brackets. PV modules 34 are bolted or riveted or otherwise secured to mounting structure 150 in a conventional fashion.

Figure 25:
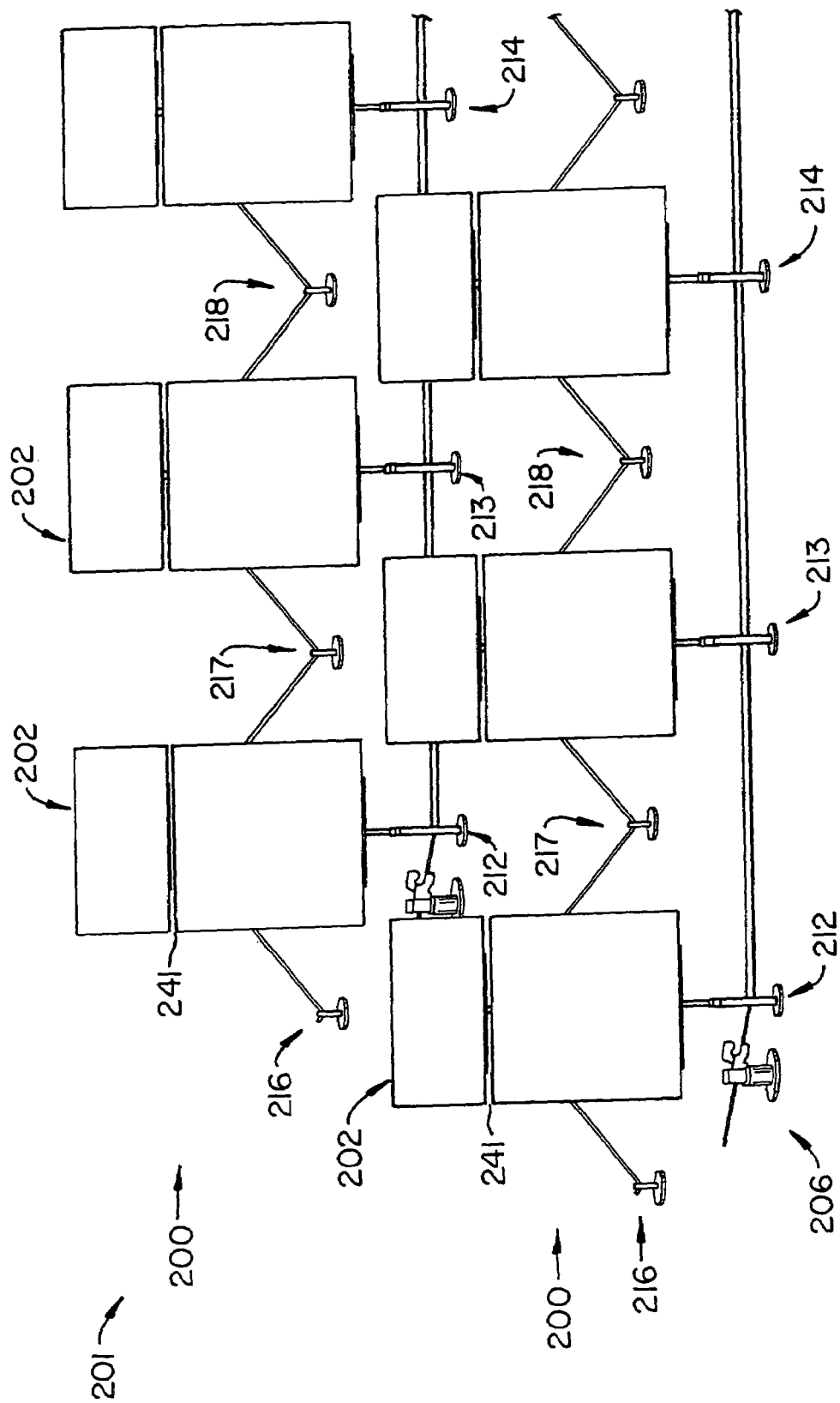
Figure 26:
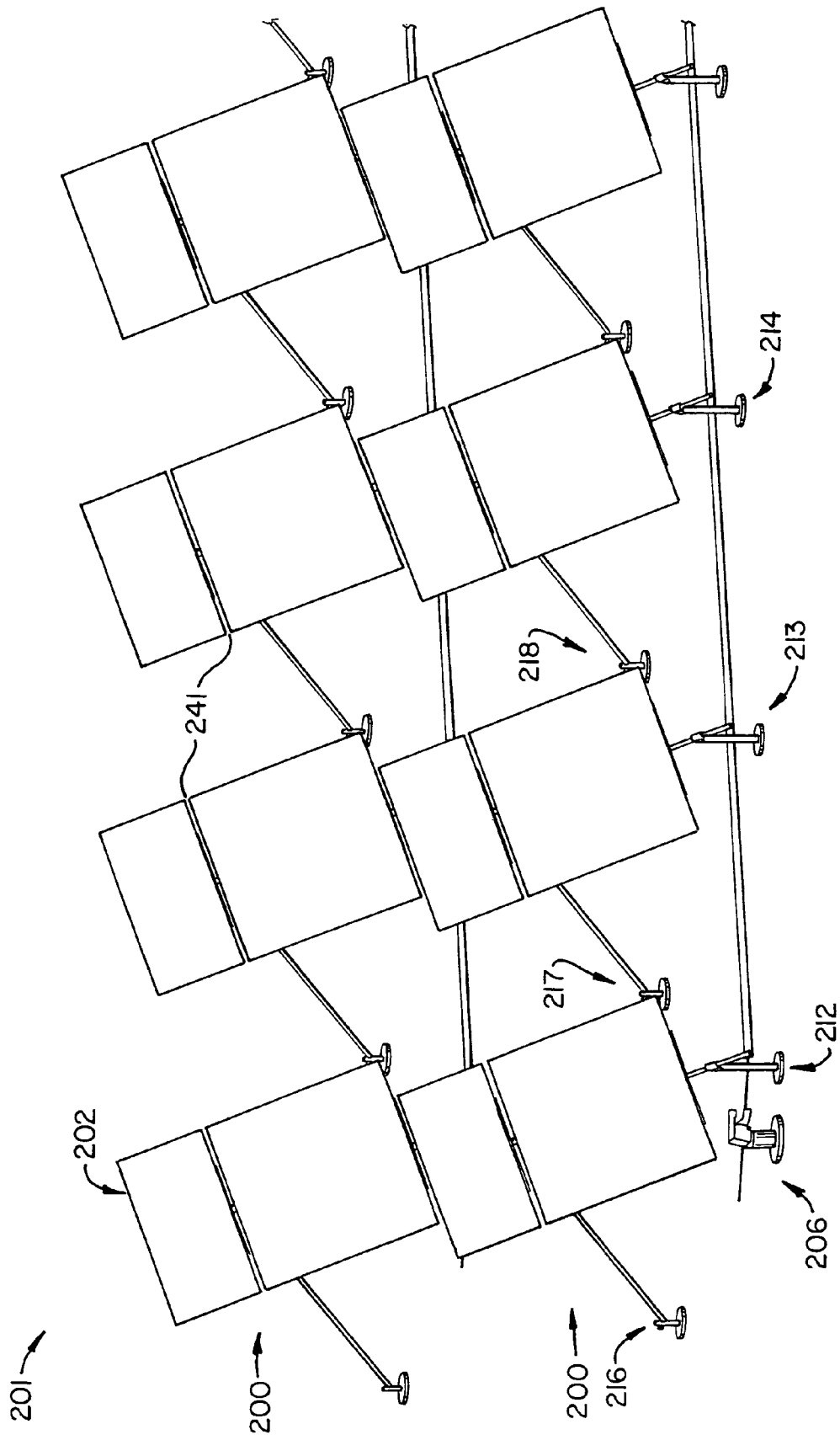
Figure 27:
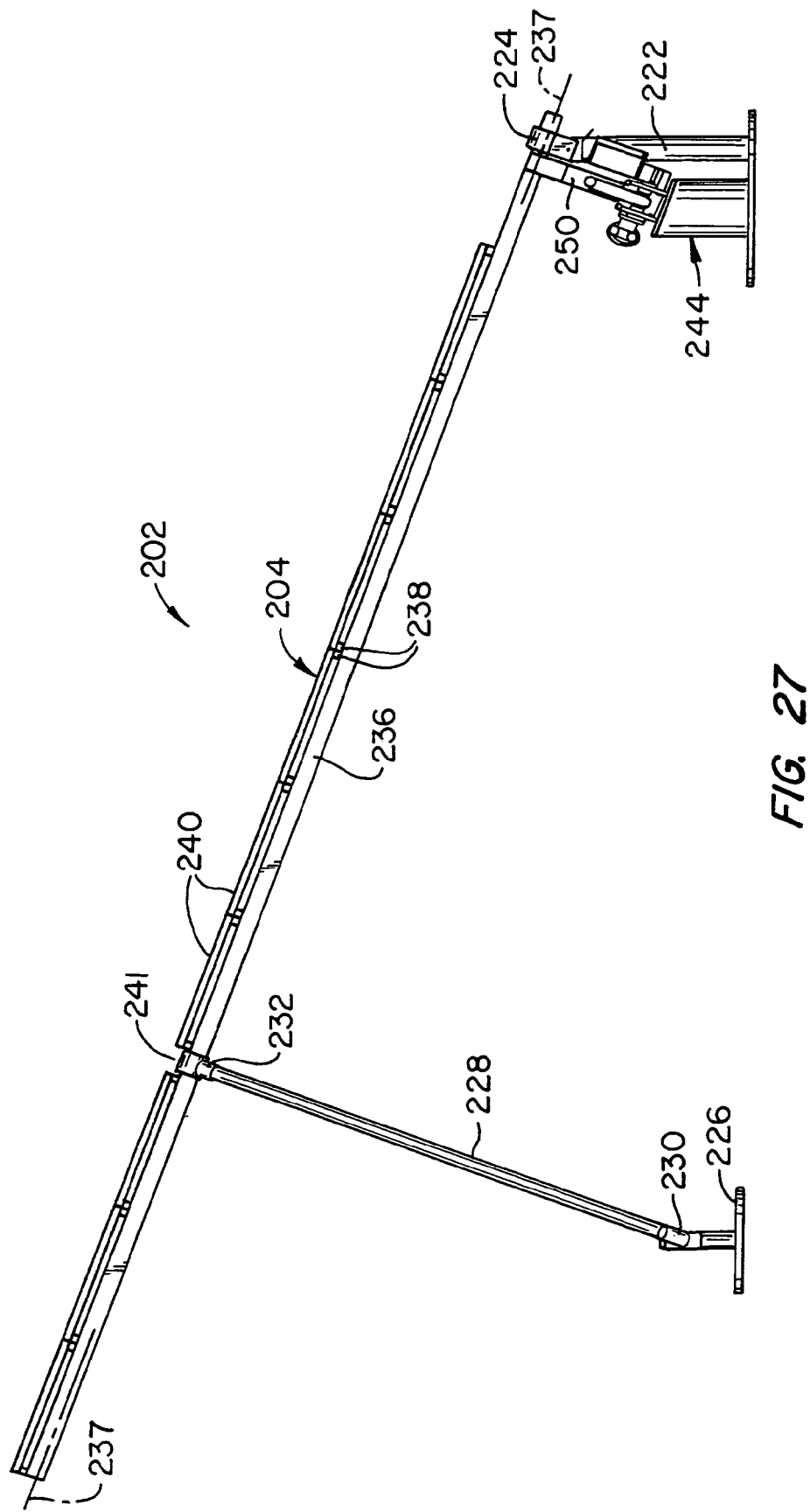

FIGS. 25-31 are directed to a further embodiment of the invention. FIG. 25 is a downwardly and North-facing view of the ends of two rows of tracking solar collection assemblies 200 of a tracking solar collector installation 201. Each assembly 200 includes a series of tracking solar collectors 202. Each tracking solar collector 202 includes a PV module array 204 (see FIG. 27) with the PV module array of each tracking solar collector at a no-tilt, noontime orientation. Each assembly 200 also comprises a tilting assembly 206 constructed to tilt each PV module array 204 in the same row of assemblies 200 between an East-tilting orientation, through a no-tilt orientation, shown in FIG. 25, and a West-tilting orientation shown in FIG. 26. Assemblies 200 are designed to permit tilting to about 45° from horizontal. It should be noted that PV module arrays 204 are generally rectangular, as opposed to the wedge-shaped arrays in many conventional tilting solar collector assemblies. See, for example, U.S. Pat. No. 6,563,040. It has been found that the wedge-shaped arrays, (placed on sites at the same density as with rectangular arrays), at the extreme tilting angles used in early morning and late afternoon, tend to shade adjacent PV arrays; to counteract this shading, the tilt angle is commonly reduced, called back tracking. While back tracking reduces shading, it causes the PV module array to be at less than an optimal tilt angle thus reducing efficiency. It has been found that by ensuring that the lower ends of PV module arrays 204 are at a sufficient height above the support surface 208 so that proper tilting is not prevented by the arrays contacting the ground an extreme tilting angles, PV module array 204 may be made with parallel lateral sides, typically in a rectangular configuration, to reduce or eliminate the need for back tracking. Support surface 208 can be, for example, paved or unpaved soil or other natural surface, a reservoir cover, or a roof.

FIGS. 25-31 illustrate the support structure of tracking solar collectors 202 used to support PV module arrays 204. The support structure includes a series of south side supports 212-214 and a series of North side supports 216-218. Each south side support 212-214 includes a base 220 extending into support surface 208, a post 222 extending vertically upwardly from base 220 and a pivot connector 224 at the upper end of post 222. Each North side support 216-218 includes a base 226, one or two struts 228 connected to base 226 by a Y-connector 230 and a second pivot connector 232 at the upper ends of struts 228. See FIG. 31.

PV module assembly 204 comprises a torque tube 236, a series of a module rails 238 secured to an extending laterally from each side of torque tube 236 and an array of PV modules 240 mounted to and supported by module rails 238. First and second pivot connectors 224, 232 are mounted to torque tube 236 at first and second support points along the torque tube. First and second pivot connectors 224, 232 are constructed to permit torque tube 236 to rotate about its own axis, that is tilt axis 237, to permit PV module assembly 204 to be tilted and track the sun. First pivot connector 224 is also constructed to permit torque tube 236 and thus PV module assembly 204 to pivot vertically about a pivot 242, shown in FIG. 29. This permit the North-south inclination angle of PV module assembly 204 to be easily changed, typically according to the length of either fixed length or variable length struts 228. This pivotal feature also permits torque tube 236 and module rails 238 to be oriented horizontally when, for example, PV modules 240 are mounted to module rails 238 in the field.

Figure 28:
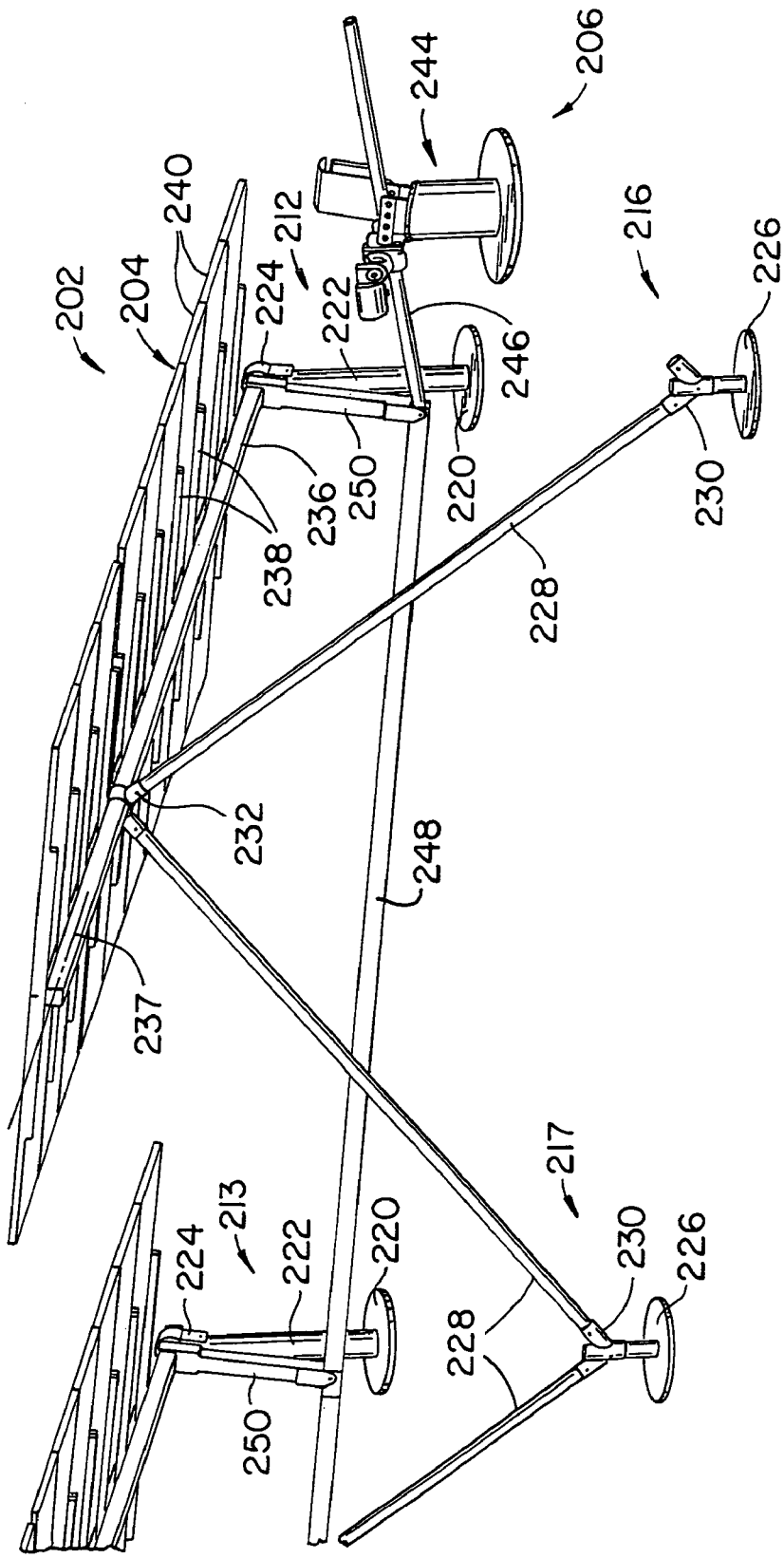
Figure 29:
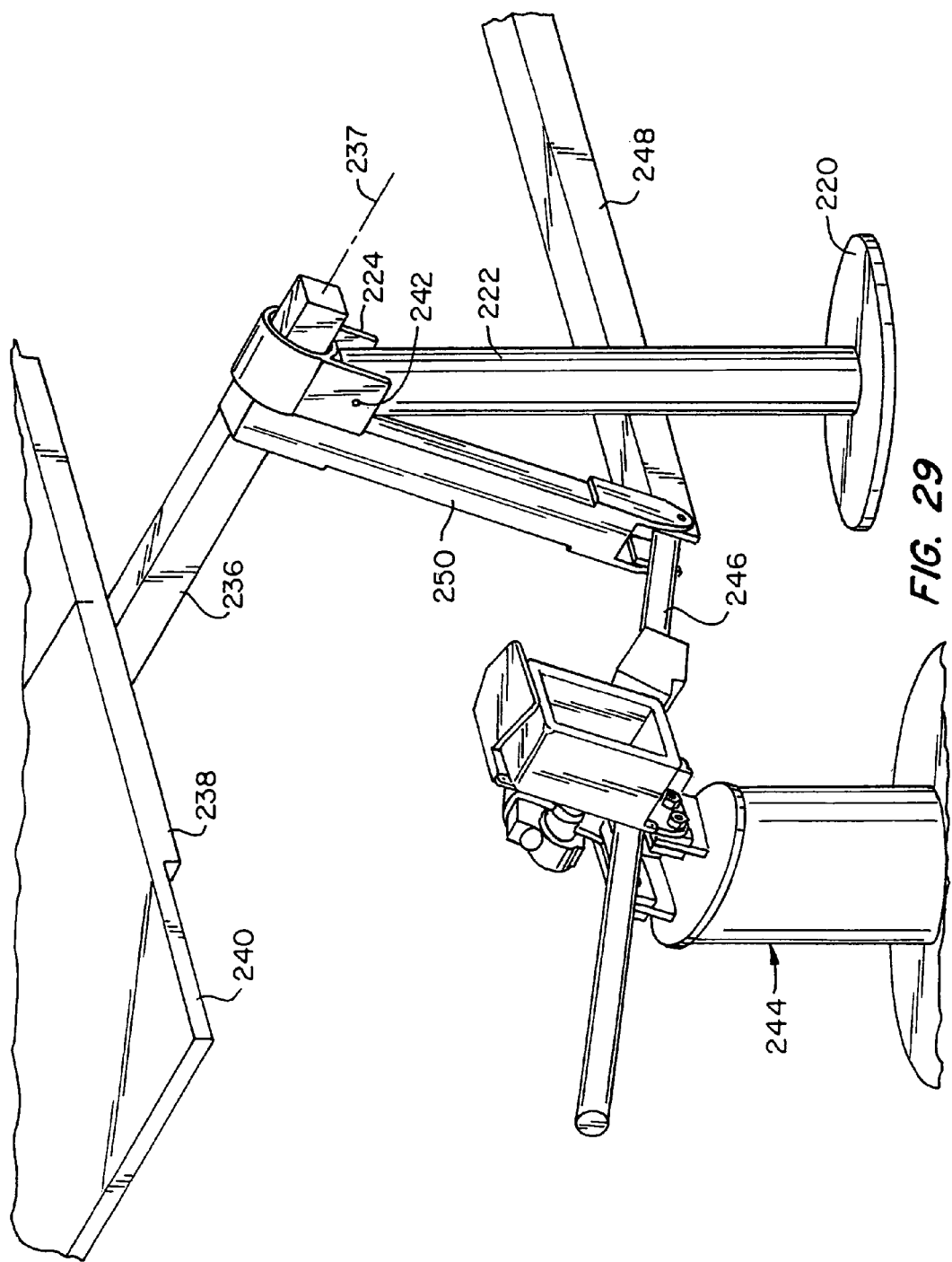

FIGS. 28 and 29 illustrate tilting assembly 206, the tilting assembly including a driver 244 including a drive rod 246 pivotally connected to a drive element coupler 248 at the distal end of drive rod 246. Drive element coupler 248 is pivotally connected to a series of drive elements 250. Each drive element 250 is non-rotatably secured to the torque tube 236 of the corresponding PV module assembly 204. Therefore, actuation of driver 244 causes drive rod 246 to push or pull drive element coupler 248 causing the entire series of PV module assemblies 204 for that row of tracking solar collector assemblies 200 to tilt, typically according to the position of the sun.

Figure 29A:
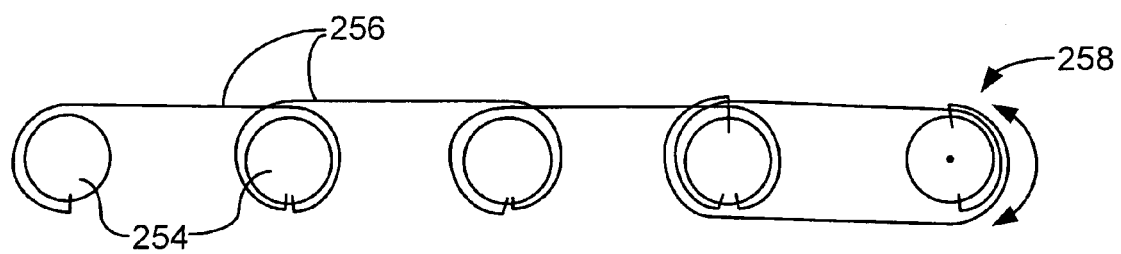
FIG. 29A is a schematic illustration of an alternative to the tilting assembly of FIG. 29 in which pulley-type drive elements are secured to the torque tubes and are connected to one another so that rotating one pulley rotates the series of pulleys and the torque tubes therewith.
Figure 30:
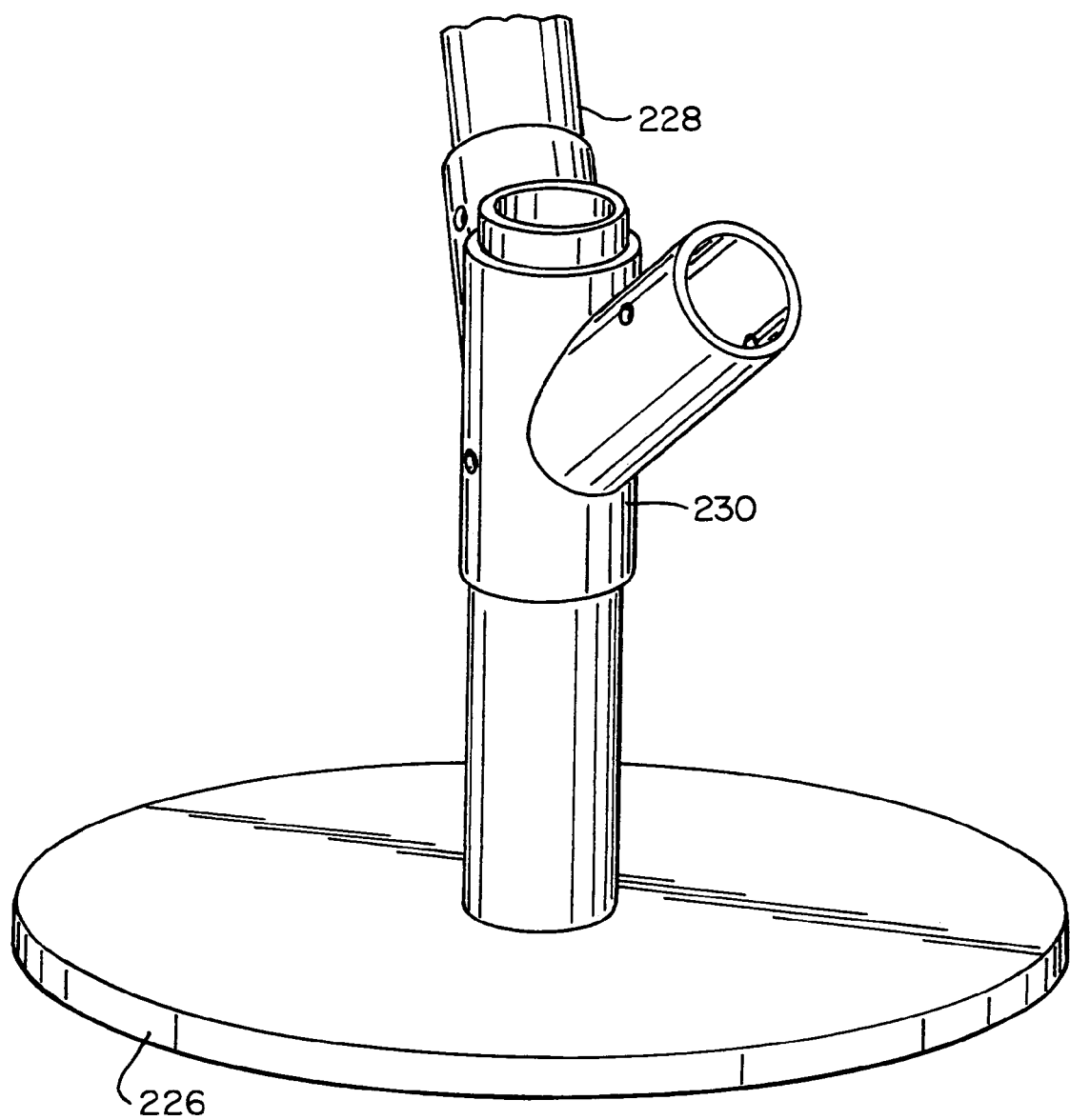
Figure 31:
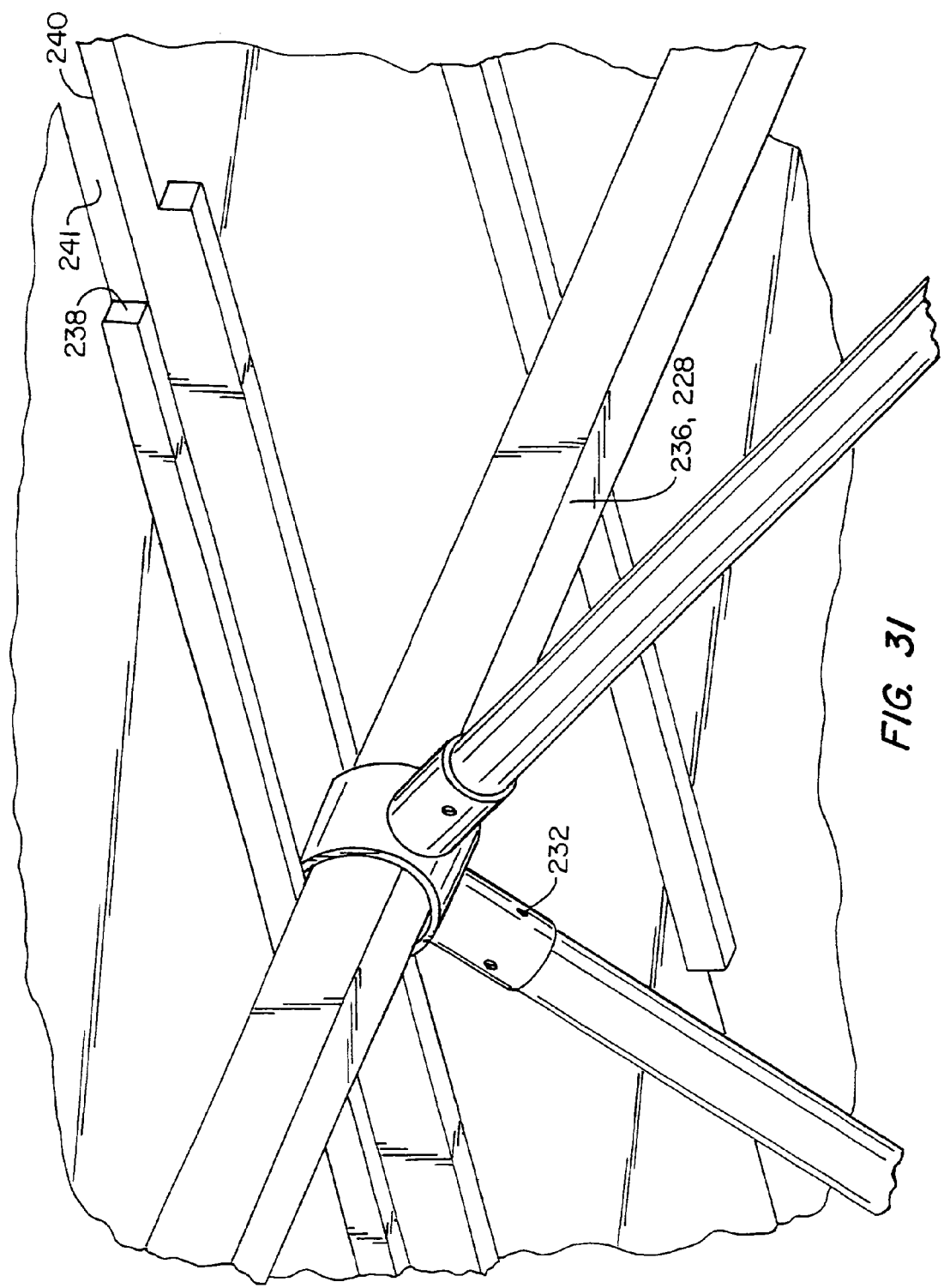

FIG. 29A is a schematic illustration of an alternative to the tilting assembly of FIG. 29. Pulley-type drive elements 254 are secured to the torque tubes and are connected to one another by belts, cables or chains 256, acting as the drive element coupler. A rotatable driver 258 is connected to and drives one of the torque tubes, and thus one of the pulley-type drive elements 254. Therefore, rotating driver 258 rotates the series of pulley-type drive elements 254 and the torque tubes therewith.

As is evident from the figures, Southside supports 212-214 are generally vertically aligned with the corresponding tilt axes 237. Posts 222 of Southside supports 212-214 are relatively sturdy because they must withstand tension and compression forces as well as bending moments. By placing the base 226 of North side supports 216-218 centrally between each torque tube 236, by securing each torque tube 236 to two downwardly angled struts 228 and by keeping the height of Y-connector 230 relatively short, the forces exerted by PV module arrays 204 on North side supports 216, 218 are controlled. That is, the bending moments on Y-connectors 230 are reduced by minimizing their heights. The use of two downwardly angled struts 228 connected to each torque tube 236 with the struts extending from positions laterally offset from the torque tubes substantially eliminates bending moments on the struts so the struts are primarily in tension or compression. In the preferred embodiment base 226 of the North side supports typically includes a galvanized steel, 3 in. diameter, 4 ft. long schedule 40 pipe (not shown) embedded within a 2 ft. diameter by 4 ft. deep concrete filled hole. This can be compared with the construction of the Southside supports in which base 220 typically includes a galvanized steel, 5 in. diameter, 6 ft. long schedule 40 pipe (not shown) embedded within a 2 ft. diameter by 6 ft. deep concrete filled hole. It is preferred that the base 226 of the North side supports be located laterally midway between the torque tubes to which they are connected.

The preferred embodiment the north-south inclination of tilt axis 237 is about 20°. The range of north-south inclinations is preferably about 15°-30°. Each PV module array 204 typically comprises 18 PV modules 240. Each tilting assembly 206 typically is designed to operate 24 tracking solar collectors 202. Tracking solar collector assemblies 200 provide good access around the structures for maintenance. When assemblies 200 are mounted to a support surface 208 that requires mowing or access by grazing animals, the open design of the components of assemblies 200 permits the necessary access.

Struts 228 are preferably perpendicular to torque tube 236. See FIG. 27. Therefore if PV module assembly 204 is tilted until it is, for example, parallel to or past one of the struts 228, about 45° in the disclosed embodiment, struts 228 will have the ability to pass into the gap 241 between two rows of PV modules 240. The combination of the perpendicular orientation of struts 228 and torque tube 236 and the provision of a properly sized gap 241 helps to expand the range of available tilt angles for PV module assembly 204 while helping to prevent damage to assemblies 204 caused by over-rotation of assemblies 204.

It is generally preferred that at the maximum rotation of PV module assembly 204, struts 228 only approach assembly 204 but do not touch the assembly. Is not desirable to have struts 228 located above PV modules 240 because the struts will shade the PV modules. Because the width of the shadow created by the strut at such extreme inclination angles is large relative to the size of PV modules 240, any significant shading of the PV modules will reduce and may effectively stop the energy production of the array.

If struts 228 were replaced with very narrow support members, so that the width of struts 228 is very small in relation to the size of PV modules 240, the struts could shade the PV modules without significantly limiting the performance of the array. This would be the case if struts 228 were replaced by, for example, cables. FIG. 32 is a simplified South-facing view of an alternative to the North side supports of FIGS. 25-31. North side supports 260-265 replace struts 228 with cables 268, 269 and a generally vertical post 270. Cables 268, 269 and post 270 are preferably oriented perpendicular to torque tube 236 and thus perpendicular to tilt axis 237. Post 270 preferably lies vertically beneath tilt axis 237. Cables 268, 269 act as opposing tension struts (one will be under tension while the other can be slack under wind load) while posts 270 act as compression struts. In this way the number of compression members of the embodiment of FIGS. 25-31 (struts 228) is reduced by 50%, with one of the compression members replaced by a pair of tension members (cables 268, 269) for interior North side supports 262, 263. As shown in the FIG. 32, the end-most North side supports 260, 265 do not need posts 270; North side supports 260, 261 do not need cables 269; and North side supports 264, 265 do not need cables 268. With this arrangement PV module arrays 204 may be routinely rotated about tilt axis 237 so that cables 268, 269 are above PV modules 240 of PV module arrays 204 without causing unacceptable shading of PV modules 240. It is expected that such positioning of cables 268, 269 above PV modules 240 will occur routinely because of the attachment geometry of cables 268, 269. With the cable strut embodiment of FIG. 32, any inaccuracy in the pier placement in the field for base 226 can be accommodated because the length of cables 268, 269 can be adjusted based on the as-built pier layout.

FIG. 33 illustrates an alternative to the embodiment of FIG. 32. The embodiments are very similar with the exception that cables 274, 276 and 278 replace cables 268 and 269. The FIG. 33 embodiment is somewhat simpler in construction than the FIG. 32 embodiment. Cables 276 connect the upper ends of posts 270 to one another, preferably at or near second pivot connectors 232. Cables 274, 278 secure the end-most posts 270 to the ground or other support surface. Cables 274, 276 and 278 are sufficiently thin so that when PV module arrays 204 are in a tilted orientation, as illustrated in dashed lines in FIG. 33, the cables do not significantly shade the PV module arrays. Cables 276, when the system is under wind load, will typically be in tension with one of cables 274, 278 being in tension and the other being slack.

It is generally preferred that cables 268, 269, 274, 276 and 278 extend from positions at or near the second pivot connectors 232 at the end of posts 270. However, in some cases it may be desirable to offset some or all of the cables from second pivot connectors 232. In such cases the gap 241 of between the PV modules 240 will preferably be aligned with the attachment points of the cables rather than at or near second pivot connectors 232.

Modification and variation can be made to disclose embodiments without departing from the subject of the invention. For example, struts 228 could be made to be variable length struts to permit the north-south inclination angle of PV module assemblies 204 to be adjusted. Torque tube 36 may have a variety of cross-sectional shapes, may have a partially or fully solid interior, may be made of one or more materials, and may have its various structural features vary along its length. Torque tube 236 and module rails 238, which act as a support or frame for PV modules 240, could be replaced by other solar collector support structure, such as a rigid rectangular platform. Therefore, tilting assembly 206 could be secured to structure other than torque tube 236. The solar collector support structure could be mounted so to tilt not about a fixed tilt axis 237 but, for example, about a range of instantaneous tilt axes. For example, the solar collector support structure could be supported on a curved surface so that actuation of tilting assembly 206 causes the solar collector support structure to roll over the curved surface. In such a case, the average or median other representative tilt axis can be considered to be the tilt axis.

Any and all patents, patent applications and printed publications referred to above are incorporated by reference.

The invention claimed is:

1. A tracking solar collector assembly comprising:
   first and second tracking solar collectors;
   first and second Southside supports;
   first, second and third North side supports;
   the Southside supports and the North side supports defining first and second generally parallel paths, the first and second paths being generally East-West paths, the first and second paths being spaced apart from one another;
   the first tracking solar collector comprising first solar collector support structure;
   the second tracking solar collector comprising second solar collector support structure;
   the first and second solar collector support structures each having first and second spaced apart pivotal support points defining a tilt axis;
   at least one solar collector mounted to each solar collector support structure;
   the first support points of the first and second solar collector support structures pivotally connected to and supported by the first and second Southside supports, respectively;
   the second support point of the first solar collector support structure pivotally connected to and supported by the first and second North side supports;
   the second support point of the second solar collector support structure pivotally connected to and supported by the second and third North side supports; and
   a tilting assembly comprising:
      a drive element secured to each solar collector support structure;
      a drive element coupler operably coupling the drive elements, the drive elements and the drive element coupler creating a drive assembly; and
      a driver coupled to the drive assembly so that operation of the driver causes the drive elements move in unison thus causing the solar collector support structures and the solar collectors therewith to tilt in unison.

2. The assembly according to claim 1 wherein at least one tilt axis is at an angle to a horizontal line.

3. The assembly according to claim 2 wherein said angle is between about 15° to 30°.

4. The assembly according to claim 2 wherein said support element is a variable-length support element to permit said angle to be changed.

5. The assembly according to claim 1 wherein the drive element is secured to each solar collector support structure at a point between the first and second support points.

6. The assembly according to claim 1 wherein a plurality of said solar collectors are mounted to the solar collector support structures.

7. The assembly according to claim 6 wherein the solar collectors define an array of solar collectors having generally parallel lateral sides.

8. The assembly according to claim 1 wherein the solar collector comprises a PV module.

9. The assembly according to claim 1 wherein the first and second Southside supports are generally vertically aligned with the tilt axes of the first and second solar collector support structures, respectively.

10. The assembly according to claim 1 wherein the second North side support is positioned laterally between the tilt axes of the first and second solar collector support structures.

11. The assembly according to claim 1 wherein the second North side support is positioned laterally midway between the tilt axes of the first and second solar collector support structures.

12. The assembly according to claim 1 wherein the first, second and third North side supports each include a base securable to a support surface, each base laterally offset from the tilt axes of the first and second solar collector support structures.

13. The assembly according to claim 12 wherein the base of the second North side support is positioned at a position laterally midway between the tilt axes of the first and second solar collector support structures.

14. The assembly according to claim 1 wherein each North side support comprises a base, mountable to a support surface, and at least one support element connecting the base to a second support point.

15. The assembly according to claim 14 wherein the base of the second North side support is positioned generally equidistant from the second support points of the first and second solar collector support structures.

16. The assembly according to claim 14 wherein said support element is a fixed-length support element.

17. The assembly according to claim 1 further comprising a fourth North side support, and wherein:
   the second support point of the first solar collector support structure is pivotally connected to and supported by the first, second and third North side supports; and
   the second support point of the second solar collector support structure is pivotally connected to and supported by the second, third and fourth North side supports.

18. The assembly according to claim 17 wherein the second support point of the first solar collector support structure is connected to the first and third North side supports by tension struts and to the second North side support by a compression strut.

19. The assembly according to claim 18 said wherein the tension struts comprise cables and the compression strut comprises a post.

20. The assembly according to claim 18 wherein the compression strut is vertically aligned with the tilt axis of the first solar collector support structure.

21. The assembly according to claim 1 wherein the solar collector support structure comprises a torque tube extending along the tilt axis.

22. The assembly according to claim 21 wherein the solar collector support structure comprises module rails secured to the torque tube and extending laterally from the torque tube.

23. A tracking solar collector installation comprising a tracking solar collector assembly according to claim 1 mounted to a support surface.

24. The installation according to claim 23 wherein the support surface comprises the ground.

25. The installation according to claim 24 wherein the ground is unpaved.

26. The installation according to claim 23 wherein the support surface comprises a roof.

27. The installation according to claim 23 wherein the support surface comprises a reservoir cover.

28. The assembly according to claim 1 wherein a plurality of solar collectors are mounted to the solar collector support structures, said plurality of solar collectors defining a gap between the solar collectors, the gap extending perpendicular to the tilt axis.

29. The assembly according to claim 28 wherein at least one of the North side supports comprises laterally extending support elements extending generally perpendicular to the tilt axes and aligned with the gap so that tilting the solar collector support structures and the solar collectors therewith causes the laterally extending support elements to pass through the gap.

30. The assembly according to claim 29 wherein the laterally extending support elements comprise struts.

31. The assembly according to claim 30 wherein the struts comprise flexible cables.

32. The assembly according to claim 30 wherein the struts comprise rods.

* * * * *